(12) United States Patent
Gertner (10) Patent No.: US 7,258,513 B2
(45) Date of Patent: Aug. 21, 2007

(54) DEPTH LIMITING DEVICE AND HOLE FORMING APPARATUS CONTAINING THE SAME

(76) Inventor: Paul Gertner, 18 A James Buchanan Dr., Monroe Township, NJ (US) 08831

( * ) Notice: Subject to any disclaimer, the term of this patent is extended or adjusted under 35 U.S.C. 154(b) by 0 days.

(21) Appl. No.: 11/125,427

(22) Filed: May 10, 2005

(65) Prior Publication Data

US 2006/0257220 A1    Nov. 16, 2006

(51) Int. Cl.
     *B23B 49/00*      (2006.01)
(52) U.S. Cl. .......................... 408/67; 408/202
(58) Field of Classification Search ............... 408/14, 408/15, 67, 110, 113, 202, 241 S
See application file for complete search history.

(56) References Cited

U.S. PATENT DOCUMENTS

| | | | |
|---|---|---|---|
| 1,057,492 A * | 4/1913 | Munzinger | ............... 408/113 |
| 2,223,485 A | 12/1940 | Eveleth | |
| 2,308,055 A | 1/1943 | Cogsdill | |
| 2,308,447 A * | 1/1943 | Greenbaum | ............... 408/113 |
| 2,390,744 A * | 12/1945 | Smith | ............... 408/202 |
| 2,402,353 A | 6/1946 | Trautmann | |
| 2,409,525 A | 10/1946 | Andreasson | |
| 2,429,375 A * | 10/1947 | Smith | ............... 279/102 |
| 2,477,891 A * | 8/1949 | O'Neill | ............... 408/113 |
| 2,529,988 A | 11/1950 | Zempel | |
| 2,823,563 A | 2/1958 | Nipken | |
| 2,937,544 A | 5/1960 | Forgy et al. | |
| 3,028,774 A | 4/1962 | Hausser et al. | |
| 3,060,772 A | 10/1962 | Crump | |
| 3,320,832 A | 5/1967 | Jensen | |
| 3,664,756 A | 5/1972 | Wells | |
| 3,689,171 A | 9/1972 | Bouzounie | |
| 4,019,827 A | 4/1977 | Christianson et al. | |
| 4,039,266 A | 8/1977 | O'Connell | |
| 4,115,017 A * | 9/1978 | Wilhelmsson | ............... 408/14 |
| 4,993,894 A | 2/1991 | Fischer et al. | |
| 5,051,043 A * | 9/1991 | Spitznagel | ............... 408/72 R |
| 5,066,172 A | 11/1991 | Swim, Jr. | |

(Continued)

FOREIGN PATENT DOCUMENTS

DE      101 54 434 A1      6/2003

(Continued)

*Primary Examiner*—Daniel W. Howell
(74) *Attorney, Agent, or Firm*—Watov & Kipnes P.C.

(57) ABSTRACT

A depth limiting device includes a stop collar having a an open end portion and an workpiece engaging portion extending along the open end portion thereof for contacting a workpiece; a spindle extending axially through the shell, the spindle including a first end extending from the exterior of the stop collar for attachment to a hole forming apparatus, and an second end interior to the stop collar for attachment to a hole forming bit, wherein the attached hole forming bit projects through the open end portion of the stop collar at a predetermined length corresponding to the desired depth of the hole in the workpiece; and a bearing assembly operatively associated with the stop collar and the spindle for isolating the rotation of the spindle from the stop collar whereby the stop collar ceases to rotate when contacting the workpiece without generating sufficient frictional contact to mar or otherwise damage the workpiece.

18 Claims, 5 Drawing Sheets

U.S. PATENT DOCUMENTS

| | | |
|---|---|---|
| 5,078,552 A | 1/1992 | Albel |
| 5,092,717 A | 3/1992 | Fischer |
| 5,096,342 A | 3/1992 | Blankenship et al. |
| 5,147,164 A | 9/1992 | Fraver |
| 5,197,833 A * | 3/1993 | Mayer et al. ............... 408/226 |
| 5,382,250 A | 1/1995 | Kraus |
| 5,795,110 A * | 8/1998 | Wirth et al. ................ 408/110 |
| 5,882,151 A | 3/1999 | Wirth, Jr. et al. |
| 6,514,258 B1 | 2/2003 | Brown et al. |
| 6,543,971 B2 | 4/2003 | Mawhinney |
| 6,739,872 B1 | 5/2004 | Turri |

FOREIGN PATENT DOCUMENTS

| | | | |
|---|---|---|---|
| DE | 10154434 A1 | * | 6/2003 |
| EP | 38405 A1 | * | 10/1981 |
| EP | 171830 A1 | * | 2/1986 |
| JP | 2005081490 A | * | 3/2005 |

* cited by examiner

DEPTH LIMITING DEVICE AND HOLE FORMING APPARATUS CONTAINING THE SAME

FIELD OF THE INVENTION

The present invention relates to a hole forming apparatus and especially drilling and boring tools which include a depth limiting device for precisely controlling the depth of the hole without damage to the surface of the workpiece. The present invention is more particularly directed to a depth limiting device removably attachable to the drilling or boring tool for limiting the depth of a hole for precision drilling, while protecting the surface of a workpiece from inadvertent marring or damage. Drilling and boring tools including the depth limiting device are also part of the present invention.

BACKGROUND OF THE INVENTION

Drills are commonly used in woodworking. They are also used for cutting holes in such materials as composite materials (e.g. composites of wood and plastic), plastics such as polypropylene and polyvinyl acetate, woods, metals, especially softer metals such as iron and the like. The drill is a tool with a rotary drill bit used to drill holes through such materials. The twist drill is the most commonly used drill, and comprises a drill bit in the form of a cylindrical metal rod with two helical "flutes" or grooves spiraling along its length. The drill bit is typically held by the drill at one end, in the "chuck", with the other end (i.e. the working end) available for drilling the workpiece when the drill bit is rotated. The working tip of the drill bit cuts into the workpiece, slicing off debris in the form of thin shavings or small particles. The debris is carried up and away from the tip via the helical flutes or grooves once it has been lifted clear of the drilling hole.

It is often desirable to drill or bore holes in a workpiece to enable connecting or fastening devices such as screws, bolts and the like to be easily inserted in the workpiece. This predrilling process reduces the force necessary to properly seat the fastening device in the workpiece and at least substantially reduces breakage of the fastening device and/or damage to the workpiece. This is especially of concern when inserting countersink fastening devices into the workpiece where the force needed for the countersink head to enter the workpiece significantly exceeds the force needed to insert the body of the fastening device into the workpiece. This sudden, sharp increase in torque can result in damage or breakage of the fastening device. For example, fastening devices which are drilled directly into the work piece can cause splitting or splintering of the workpiece at the surface of the workpiece. Even when successfully inserted without predrilling, the fastening device may cause the workpiece to split, requiring the workpiece to be replaced. Another common problem without predrilling is splintering, which leaves an unsightly appearance that can only be remedied by sanding and the like. Also, if the workpiece is made out of either plastic or plastic/wood composite, predrilling can prevent the waste from gathering at the top of the waste piece in unsightly small mounds, commonly referred to as surface "volcanoes".

It is desirable to pre-drill the holes to a precise depth corresponding to the depth of the fastening device when precisely seated within the workpiece so that the top or head of the fastening device is even with the surface of the workpiece. Accordingly, it is desirable to provide devices that accurately limit the depth of the drilling hole to provide precise seating of the fastening device within the workpiece. Devices for limiting the depth of a drilling tool have been used to provide more precise drilling performance and typically include a body that is removably attached to the drilling tool, for example, by a set screw extending through the body. The device may be secured to the drilling tool at a select position, which defines the depth of the drilling hole by limiting the forward penetration of the drilling tool into the workpiece.

Once the depth limiting device comes into contact with the workpiece, the drilling tool is prevented from penetrating further into the workpiece because the depth limiting device acts as a barrier against further penetration. Because the depth limiting device is typically affixed to the drilling tool so that it cannot rotate independently with respect thereto, the depth limiting device continues to rotate with the drilling tool when it comes into contact with the workpiece. The driving frictional contact between the depth limiting device and the workpiece can cause marring or other damage to the workpiece.

Depth limiting devices for drilling tools having rotatable contact structures are also known in the art. The contact structures rotate with the drilling tool (i.e., drill bit) thereby generating frictional contact between the depth limiting device and the workpiece. During operation, as the rotatable contact structure comes into contact with the workpiece, marring of the workpiece results since the stoppage of rotation is not immediate and significant frictional contact is applied to the workpiece. The rotatable contact structure possesses rotational momentum which generates a level of frictional contact that cannot be immediately eliminated when the depth limiting device comes into contact with workpiece. This can result in some damage to the workpiece, and to the contact surface of the depth limiting device itself.

Depth limiting devices must also precisely limit the depth of the drilling hole. However, during drilling or boring, debris is generated from the workpiece, which can interface with the surface of the workpiece thereby increasing the possibility of an inaccurate drill hole. In particular, the presence of debris can prevent all or a portion of the contact surface of the depth limiting device from contacting the surface of the workpiece, thus causing the depth of the hole to be inaccurate. Moreover, the contact structures can adversely interact with the debris present at the interface of the depth limiting device and the workpiece in a manner that can mar or damage the surface of the workpiece.

Accordingly, there is a need for a depth limiting device for use with a hole forming apparatus such as a drilling or boring tool that is designed to drill or bore a hole to a desired precise depth, while effectively protecting the surface of the workpiece from marring or other damage. There is a further need for a depth limiting device that minimizes the presence of debris on the surface of the workpiece, thus facilitating precise drilling and easy clean up. Furthermore, there is a need for a depth limiting device that is simple and cost efficient to make and use.

SUMMARY OF THE INVENTION

The present invention relates generally to a depth limiting device for attachment to a hole forming apparatus such as a drilling or boring tool in a manner that promotes or facilitates precise drilling or boring, while preserving the surface of a workpiece around the drilled hole. The depth limiting device of the present invention is designed to prevent or at least substantially reduce the incidence of marring or other damage to the workpiece. The depth limiting device of the present invention includes a stop collar comprising a shell having an open end and a workpiece engaging portion extending along the open end thereof for contacting the workpiece. The present invention also includes drilling and boring tools that include the depth limiting device.

According to the present invention, the stop collar is adapted to rotate independent of the drilling tool so that with only the slightest contact with the workpiece, the stop collar ceases rotation. As a result there is minimal driving frictional contact with the workpiece, which minimizes marring, or other damage to the workpiece from the drilling operation. In addition, the operator of the drilling tool can use the stoppage of rotation of the stop collar as a precise indication the hole has been drilled to the precise depth desired. Still further, the stop collar may be provided with a visually observable design to more effectively show when the stop collar has ceased rotation.

The stop collar may include a cavity for collecting and compacting any debris associated with the drilling operation to prevent the debris from undesirably contacting the workpiece that may lead to inaccurate depth drilling, marring or other damage of the workpiece. The presence of the debris collecting cavity enables collection and compaction of the debris and the release of the debris collected therein. The cavity is also designed to allow very fine debris to fall out of the cavity and away from the workpiece. Alternatively, the stop collar may be provided with openings in the shell sufficient to enable the debris to enter and exit the stop collar away from the surface of the workpiece.

The depth limiting device of the present invention is designed to attach to any standard hole forming apparatus such as a drilling or boring tool including portable drills and drill presses. The depth limiting device is especially useful in predrilling countersink holes using a countersink drill bit.

In one aspect of the present invention, there is provided a depth limiting device for generating a hole in a workpiece, comprising:

a stop collar comprising a shell having an open end portion and a workpiece engagement portion extending along the open end portion thereof for contacting a workpiece;

a spindle extending axially through the shell, the spindle including a first end extending from the exterior of the stop collar for attachment to a hole forming apparatus such as a drilling or boring tool, and an second end interior to the stop collar for attachment to a hole forming bit, wherein the attached bit projects through the open end portion of the stop collar at a predetermined length corresponding to the desired depth of the hole in the workpiece; and means operatively associated with the stop collar and the spindle for isolating the rotation of the spindle from the stop collar whereby the stop collar ceases to rotate when contacting the workpiece without generating sufficient frictional contact to mar or otherwise damage the workpiece.

In another aspect of the present invention, there is provided a device for precisely incorporating a hole into a workpiece, comprising:

a) a hole forming tool; and
b) a depth limiting device operatively connected to the hole forming tool, comprising:
  a stop collar comprising a shell having an open end portion and a workpiece engaging portion extending along the open end portion thereof for contacting a workpiece;
  a spindle extending axially through the shell, the spindle including a first end extending from the exterior of the stop collar for attachment to the hole forming tool, and an second end interior to the stop collar for attachment to a hole forming bit, wherein the attached hole forming bit projects through the open end portion of the stop collar at a predetermined length corresponding to the desired depth of the hole in the workpiece; and
  means operatively associated with the stop collar and the spindle for isolating the rotation of the spindle from the stop collar whereby the stop collar ceases to rotate when contacting the workpiece without generating sufficient frictional contact to mar or otherwise damage the workpiece.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed generally to a depth limiting device designed for operation with a hole forming apparatus such as a drilling or boring tool for forming a hole of a predetermined depth in a workpiece. It will be understood that the depth limiting device is applicable to a variety of tools including drilling and boring tools that are used to create a hole in a solid workpiece to facilitate entry of a fastening device such as a screw (e.g. countersink screw, bolt and the like). By way of example, future reference will be to a depth limiting device for use with a drill, especially a drill for predrilling countersink holes.

The depth limiting device of the present invention prevents marring or other damage to the surface of the workpiece, and reduces or eliminates the presence of debris around the surface of the workpiece. The depth limiting device may include a removable depth adjusting mechanism for adjusting the depth of the drilling hole as desired by the user. Optionally, the depth limiting device of the present invention may include a countersink drilling element for producing a countersink hole. The hole forming apparatus may also include an assembly for replacing the hole forming bits as may be required.

In one embodiment of the present invention, the depth limiting device comprises a stop collar that is in the form of a shell, preferably a substantially cylindrical shaped shell, having an open end portion and a workpiece engaging portion extending along the open end portion thereof for contacting the surface of the workpiece. The cylindrical shell as described may be in the form of an inverted cup which is shaped to facilitate discharge of debris away from the workpiece either by employing one or more openings in the stop collar for discharge of debris or by enclosing the stop collar for the collecting and compacting of debris within the thus formed cavity and the easy release of debris therefrom. The depth limiting device further includes a spindle extending axially through the shell. The spindle includes a first end extending exterior of the stop collar for attachment to a drilling tool, and a second end positioned within the stop collar for permanent or releasable attachment to a drilling bit. The attached drilling bit projects through the open end portion of the stop collar at a predetermined length corresponding to the desired drill depth of the hole in the workpiece including the depth of a countersink bore if present.

The depth limiting device also includes a mechanism for isolating the rotation of the spindle from the stop collar so that the stop collar may freely rotate independently of the drill bit, which allows the stop collar to stop rotating upon minimal driving frictional contact when the workpiece engaging portion contacts the workpiece, while allowing the spindle and drill bit to continue rotating. There is also provided on the stop collar a visually observable design which can be distinguished by the operator when the stop collar has ceased rotation to provide an observable means of precisely determining when the stop collar has ceased rotating and, as a result an observable means of showing when the predrilled hole has been drilled to a precise pre-determined depth.

Figure 1:
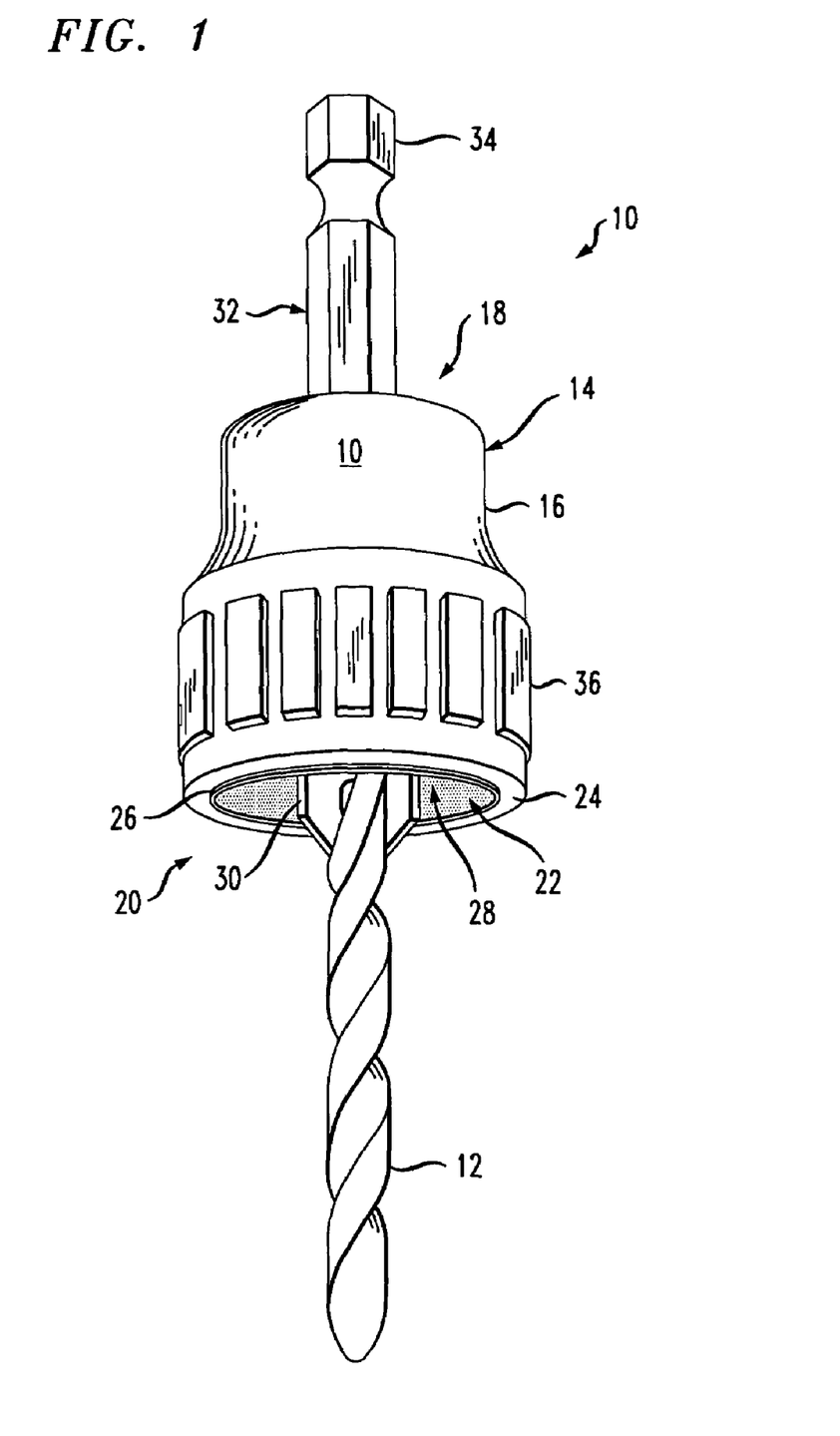
FIG. 1 is a perspective view of a depth limiting device as an attachment for a drilling tool for one embodiment of the present invention.
Figure 5:
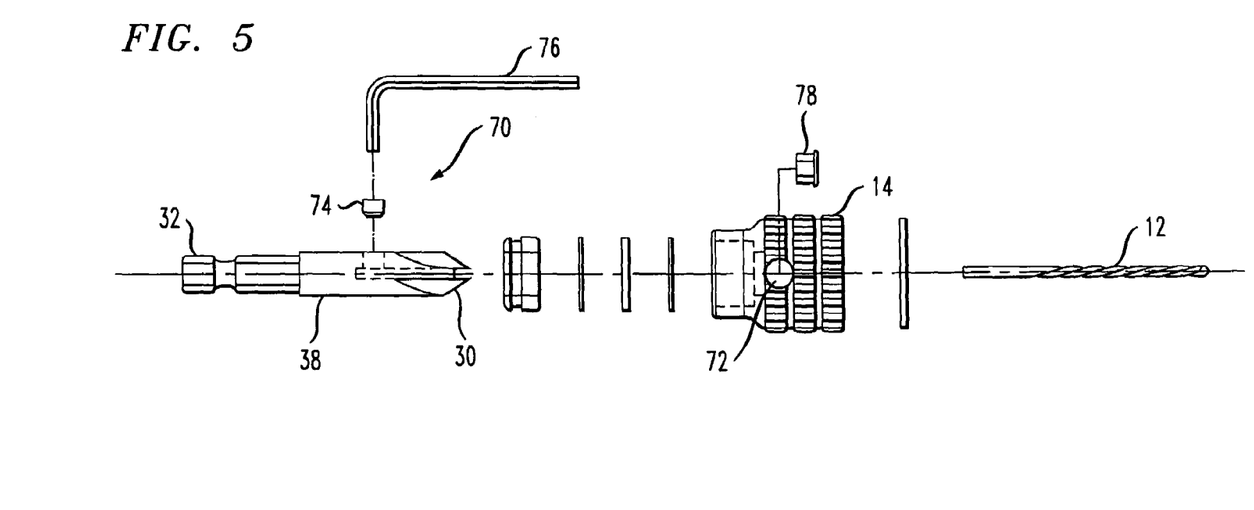
FIG. 5 is an exploded view of a stop collar employing a drill bit replacement assembly.

With reference to FIG. 1, there is shown for one embodiment of the present invention a depth limiting device identified generally by the reference numeral 10 with a hole forming device in the form of a drill bit 12 attached thereto. The depth limiting device 10 is useful for implementation with various hole forming tools including drilling and boring tools as, for example, electric hand-holdable drills, and drill presses. The drill bit may be selected from any suitable drill bits including, but not limited to, twist drill bits, spade drill bits, brad point drill bits, countersink drill bits, hole saw bits, Forstner bits, masonary bits, and corner bits. The drill bit shown in the drawings and particularly FIG. 1 is a countersink drill bit having countersink cutting edges 30 for forming a countersink hole. The drill bit 12 may be permanently attached to the depth limiting device via a suitable fastener mechanism as known in the art. The drill bit maybe removably fastened to the depth limiting device through a drill bit replacement assembly to allow replacement of worn or damaged drill bits as shown in FIG. 5 herein and as discussed hereinafter.

The depth limiting device 10 shown specifically in FIG. 1 includes a stop collar 14 having a substantially cylindrical shell 16 in the form of an inverted cup with a closed proximal end portion 18 and an open distal end portion 20, and a spindle 32 extending axially through the closed proximal end portion 18 of the stop collar 14. The spindle 32 is securely connected to a drilling tool (not shown), such as a drilling machine or auger, via a connector portion 34. The connector portion may be inserted into a gripping device, such as a collet grip or chuck. The spindle 32 is structurally coupled to the drill bit 12 at the end opposite from the connector portion 34, and thus transmits rotational power from the drilling tool to the drill bit 12. The stop collar 14 is adapted to rotate independently from the spindle 32 and the drill bit 12 as will be further described hereinafter.

The stop collar 14 includes an opening 22 and a workpiece engaging portion 24 extending along the periphery of the opening 22 at the bottom end portion 20. The workpiece engaging portion 24 of the stop collar 14 is adapted to contact the surface of a workpiece during the drilling operation. Because the stop collar 14 rotates essentially independently of the spindle 32 (and drill bit 12), it will cease rotating upon minimal driving frictional contact with the workpiece and therefore at least substantially avoids marring of the workpiece. As used herein the term "minimal driving frictional contact" shall mean the minimal force or resistance necessary to completely stop rotation of the stop collar while avoiding marring of the workpiece.

It is preferred that the workpiece engaging portion 24 of the stop collar 14 be composed of a material exhibiting a low coefficient of friction such as TEFLON™ or nylon to further minimize the possibility of marring or other damage to the workpiece, while generating sufficient friction to overcome the momentum of the stop collar 14 and cause it to stop rotating upon contact. The stop collar 14 may further include a stop ring 26 composed of a resilient material such as rubber. The stop ring 26 extends along and forms part of the workpiece engaging portion 24 and is the part of the workpiece engaging portion 24 that comes directly in contact with the workpiece. The stop ring 26 provides a cushioning and gripping effect during contact with the workpiece and therefore facilitates the immediate stoppage of rotation of the stop collar with the workpiece.

The cylindrical shell 16 is preferably constructed of a hard but lightweight material typically a plastic or metal, such as a TEFLON™-polycarbonate blend or nylon. As noted above, the workpiece engaging portion 24 of the shell 16 is preferably composed of a material having a low coefficient of friction, preferably in the range of 0.04 to 0.10, such as nylon, but may also be formed from a TEFLON™ polycarbonate blend or any other suitable material.

In the embodiment of FIG. 1, the stop collar 14 comprises a cavity 28 defined by the interior of the cylindrical shell 16 which is in communication with the opening 22. During drilling, debris generated by the interaction of the drill bit and the workpiece is effectively initially collected and then compacted as more debris accumulates in the cavity 28. The compacted debris forms an agglomerated mass, which may be subsequently removed by the user.

The compacted debris in the cavity 28 may be released by rotating the drill bit while holding the stop collar 14 to prevent rotation thereof. The turbulence created within the cavity by rotation of the drill bit 12 is usually sufficient to dislodge the compacted debris. Alternatively, the operator may insert a hole forming device such as a screw or other pointed object into the cavity to dislodge the debris. Accordingly, the stop collar 14 effectively prevents debris from dropping onto the surface of the workpiece, which could result in imprecise drilling depth and/or inadvertent marring or other damage to the workpiece.

The size of the cavity 28 can vary. However, the cavity must be sufficiently large to enable the debris to be collected therein, yet small enough to enable the collected debris to be compacted therein as an agglomerated mass during the hole forming operation.

The cavity is preferably sufficiently large so that debris from at least twenty predrilling holes can be collected and compacted before it is necessary to remove the debris. The size of the cavity may be selected depending on a variety of factors including the type of debris including shape and density, the dimensions of the hole (and therefore the amount of debris per hole) and the like. By way of example and for illustrative purposes only, a depth limiting device of the present invention for predrilling using a #10 countersink screw having a countersink bore depth of about 13 mm and a bit length measured from the end of the countersink of about 27 mm would employ a stop collar having a cavity with a depth of about 15.6 mm, an inside diameter of about 20 mm and an inside spacing between the countersink bore and the inside cavity wall of about 5.25 mm.

A plurality of ridges 36 may be applied to the exterior portion of the cylindrical shell 16 of the stop collar 14 to provide the user with a gripping surface to stop the stop collar 14 from rotating during drilling. Independently from providing a gripping surface, the ridges 36 can also provide a visual means of determining precisely when the stop collar 14 stops rotating. When the stop collar rotates during the drilling operation, the ridges 36 become blurred to the naked eye (i.e. the individual ridges are not readily discernible) depending on the speed of rotation. When the stop collar 14 engages the workpiece at the minimal driving frictional contact, the stop collar stops rotating and the ridges are no longer blurred but are readily discernible. The observance of the individual ridges 36 is therefore an immediate indication that the stop collar 14 has stopped rotating and the hole has reached the desired depth in the workpiece.

In addition to or as an alternative, all or part of the outside surface of the stop collar 14 can be made more visible to the naked eye such as by using a different color, especially a bright color than the rest of the stop collar. The presence of a more distinct color on the stop collar can also facilitate observance of the precise moment that the stop collar ceases rotation when it achieves minimal driving frictional contact with the workpiece.

Figure 2:
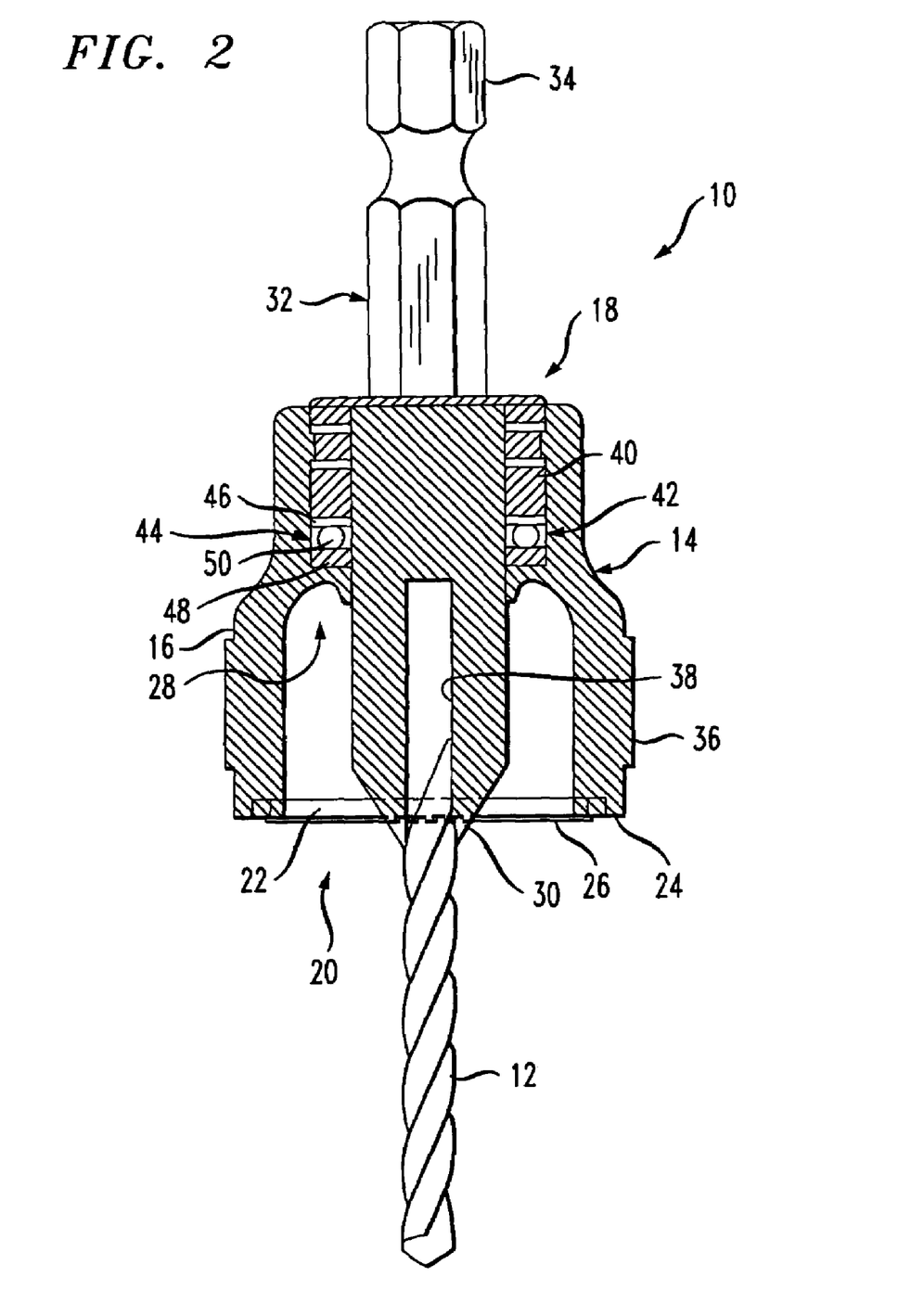
FIG. 2 is a partial cross sectional view of the depth limiting device shown in FIG. 1.

Referring to FIG. 2, a partial cross section of the assembly 10 is shown. The spindle 32 extends axially through the proximal end portion 18 of the stop collar 14. The spindle 32 includes a centrally located drill bit retaining portion 38 for accommodating and retaining the drill bit 12, and multiple countersink cutting edges 30 positioned radially around the drill bit 12. In the embodiment illustrated by FIG. 2, the spindle 32 and the drill bit retaining portion 38 are integral with each other and are formed as a single unit such that the drill bit 12 is not independently replaceable (i.e. the drill bit must be replaced by replacing the stop collar).

In a further embodiment of the invention as illustrated in FIG. 5, the drill bit is replaceable when it becomes worn or damaged. Referring to FIG. 5, there is shown a drill bit retention assembly 70 which includes an axial opening 72 in the stop collar 14 sufficient to enable the insertion and removal of a set screw 74 therein. The set screw 74 is of sufficient length so as to enable locking contact with the drill bit 12 through the use of a suitable locking device 76 shown in the drawing as an Allen wrench. The set screw 74 may be covered by a plug 78 made of a suitable plastic material when the drill bit 12 is in operation.

Referring again to FIG. 2, the spindle 32 is secured within the cylindrical shell 16 of the stop collar 14 by a rotatable annular carriage body 40. The carriage body 40 prevents the spindle 32 from moving axially within the cylindrical shell 16, while facilitating rotation movement of the spindle 32 therein.

The carriage body 40 is operatively engaged to an annular bearing assembly 42 comprising a bearing ring 44 inserted between a first washer 46 and a second washer 48. The bearing ring 44 includes a plurality of bearings 50 retained along the length thereof. The first washer 46 is positioned in contact with the carriage body 40 and the bearing ring 44, and the second washer 48 is positioned in contact with the cylindrical shell 16 and the bearing ring 44. The first and second washers 46 and 48 are preferably comprised of a material having a low coefficient of friction such as plastic (e.g. nylon), metal, rubber which may be heat treated. Preferably the coefficient of friction is in the range of 0.04 to 0.10. In this manner, the bearing assembly 42 effectively isolates rotation of the spindle 32 via the carriage body 40 from the rotation of the stop collar 14.

The interior wall of the cylindrical shell 16 and the drill bit retaining portion 38 of the spindle 32 define the cavity 28. The cavity 28 is contoured to collect and compact the debris generated by the drill bit 12 as explained previously. The collected debris is gathered into an agglomerated mass and therefore compacted that remains within the cavity 28 during the drilling operation until removed by the operator in the manner previously described.

Figure 3:
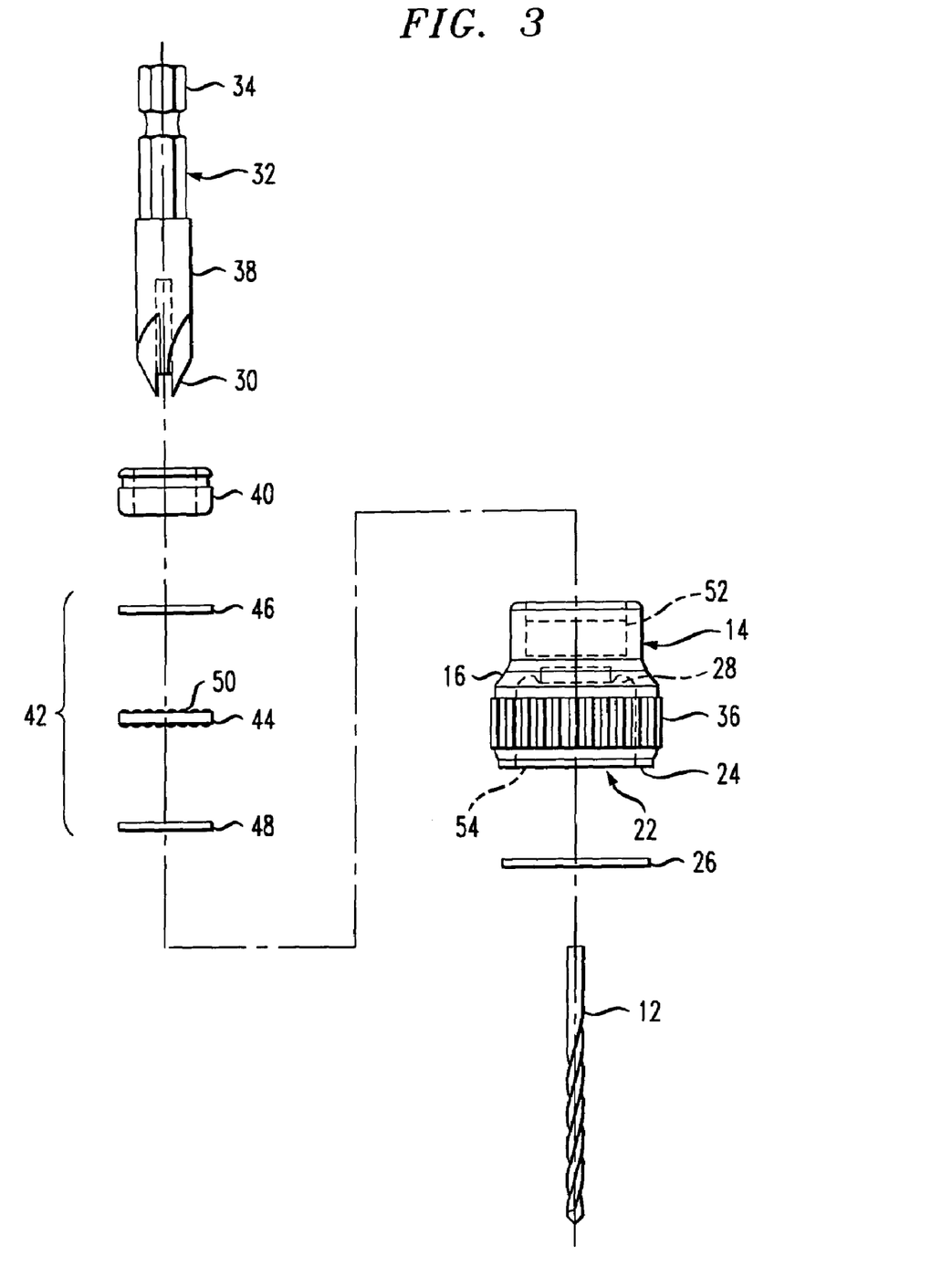
FIG. 3 is an exploded assembly view of the depth limiting device in accordance with the present invention.

Referring to FIG. 3, the drill bit-retaining portion 38 of the spindle 32 is secured to the annular carriage body 40. The carriage body 40 and spindle 32 are positioned in the bore 52 of the cylindrical shell 16 on top of the bearing assembly 42 with the drill bit retaining portion 38 occupying the cavity 28. The resilient stop ring 26 is placed into a groove 54 of the cylindrical shell 16 to form part of the workpiece engaging portion 24. The drill bit 12 is inserted into the drill bit-retaining portion 38 of the spindle 32 through the opening 22. The drill bit 12 may be permanently secured through any suitable means such as a fastener, adhesive, welding, and the like or may be reversibly secured such as by a set screw assembly as described in connection with FIG. 5.

Figure 4:
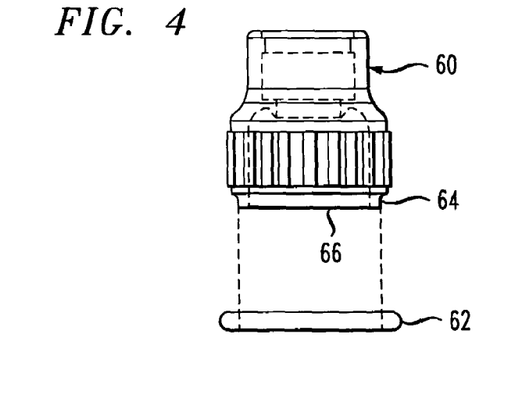
FIG. 4 is an assembly view of a stop collar for an alternate embodiment of the present invention.

Referring to FIG. 4, a cylindrical shell 60 of a stop collar is shown for an alternate embodiment of the present invention. The cylindrical shell 60 includes a chamfered portion 64 extending around the opening 66 thereof. The chamfered portion 64 is adapted to accommodate and retain a depth-adjusting member 62. The depth-adjusting member 62 may be comprised of varying thicknesses which allow the drilling depth to be varied as desired. The depth-adjusting member 62 may operate as a stop ring 26 as previously described if it is preferably composed of a resilient material such as rubber to cushion contact and cease rotation of the stop collar relative to the spindle and the drill bit.

In a further embodiment of the invention, the stop collar is provided with openings enabling the debris to pass out of the cavity. In this embodiment, the debris does not have to be removed from the cavity as described in connection with the embodiments of FIGS. 1-5.

Figure 6:
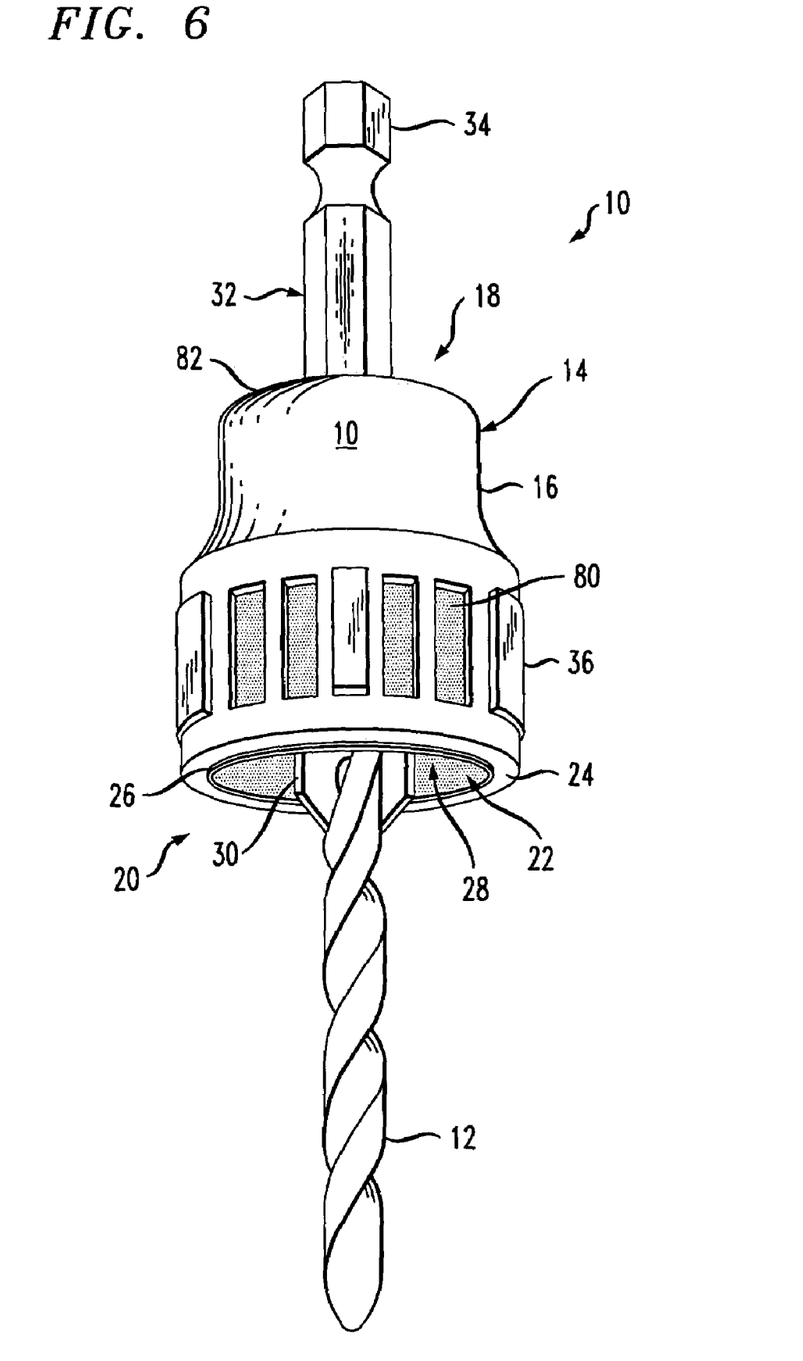
FIG. 6 is a perspective view similar to FIG. 1 of a depth limiting device with vents in the stop collar to allow escape of debris.

Referring to FIG. 6, the stop collar is provided with a plurality of spaced apart vents 80 of sufficient area so as to enable debris to exit therethrough. The vents 80 are preferably spaced about the side of the stop collar 14 in locations where debris can readily pass through. While spaced apart vents 80 are shown on the stop collar, one or more openings may be provided at the top end 82 of the stop collar to enable the debris to exit out of the top of the stop collar.

The operation of the depth limiting device of the present invention will be explained with reference to FIGS. 1 to 3. The user secures the assembly 10 to a drilling tool by inserting the connector portion 34 of the spindle 32 into a gripping device, such as a collet grip or chuck. The drill bit 12 may be pre-secured or affixed by the user into the drill bit-retaining portion 38 of the spindle 32 through a suitable fastening means. The user then positions the drilling tool with the tip of the drill bit 12 pressed against the workpiece. The user actuates the drilling tool to cause the drill bit 12 to penetrate into the workpiece. The drilling continues until the workpiece engaging portion 24 of the stop collar 14 contacts the workpiece preventing the drill bit 12 from penetrating any further into the workpiece. The precise moment at which the stop collar ceases rotation can be facilitated by a visual means such as employing ridges 36 and/or a distinguishable (e.g. colored) surface on the outside of the stop collar. The user can thereafter withdraw the drill bit and drilling tool from the workpiece, thus completing the drilling operation. The user may remove the collected and compacted drilling debris from the cavity 28 of the stop collar 14 between drilling operations by rotating the drill while holding the stop collar or through the use of a fine point instrument such as a screw inserted into the cavity.

A broken or worn drill may be replaced by employing a drill bit retention assembly described in FIG. 5 in which a set screw is loosened to enable removal of the used drill bit. A new drill is then inserted and locked in place by tightening the set screw.

What is claimed is:

1. A depth limiting device for generating a hole in a workpiece, enabling precise seating of a countersink insert having a countersink portion within said hole at a precise desired depth, comprising:
   a stop collar comprising a shell having an open end portion and a workpiece engaging portion extending along the open end portion thereof for contacting a workpiece;
   a spindle extending axially through the shell, the spindle including a first end extending from the exterior of the stop collar for attachment to a hole forming apparatus, and a second end interior to the stop collar having a centrally located hole forming bit retaining portion having an integral countersink portion for precisely receiving the hole forming bit therein in a fixed depth limiting position, wherein the attached hole forming bit projects through the open end portion of the stop collar at a predetermined length corresponding to the desired depth of the hole in the workpiece to enable insertion of the countersink insert precisely matched to the hole therein; and
   isolating means operatively associated with the stop collar for isolating rotation of the stop collar from the spindle, said isolating means comprising a rotatable annular carriage body and a bearing assembly contained within the annular carriage body for preventing the spindle from moving axially within the stop collar during operation of the hole forming apparatus, and for isolating the rotation of the spindle from the stop collar whereby the stop collar ceases to rotate when contacting the workpiece without generating sufficient frictional contact to mar or otherwise damage the workpiece.

2. The depth limiting device of claim 1 wherein the shell has a substantially cylindrical shape.

3. The depth limiting device of claim 1 wherein the shell further comprises a cavity for collecting and compacting debris generated by the hole forming bit during operation wherein the debris is collected in the cavity and compacted for subsequent removal by the user.

4. The depth limiting device of claim 1 wherein the shell further comprises at least one opening therein to enable debris to pass therethrough.

5. The depth limiting device of claim 4 wherein the at least one opening is located at the top of the shell.

6. The depth limiting device of claim 4 wherein the at least one opening is located on the side of the shell.

7. The depth limiting device of claim 1 wherein the workpiece engaging portion further comprises a stop ring comprised of resilient material extending along the length thereof having a low coefficient of friction.

8. The depth limiting device of claim 1 wherein the workpiece engaging portion is adapted for reversibly receiving and retaining a depth adjusting member thereon.

9. The depth limiting device of claim 8 wherein the depth adjusting member is composed of a resilient material.

10. The depth limiting device of claim 1 wherein the hole forming bit is integral with the spindle so that replacement of the hole forming bit requires replacement of the depth limiting device.

11. The depth limiting device of claim 1 wherein the hole forming bit is replaceable, said hole forming bit retaining portion comprising a chamber including an upper end for precisely receiving the hole forming bit against said upper end in said fixed depth limiting position, said depth limiting device further comprising a hole forming bit replacement assembly comprising an axial opening and a set screw reversibly insertable into the axial opening to engage in reversible locking contact a portion of the hole forming bit while precisely received within the hole forming bit retaining portion against said upper end and in said depth limiting position.

12. The depth limiting device of claim 1 wherein the bearing assembly comprises:
   a bearing ring comprising a plurality of bearings radially retained along the length thereof;
   a first washer in contact between the carriage body and the top portion of the bearing ring; and
   a second washer supporting the bottom portion of the bearing ring and in contact with the interior of the stop collar.

13. The depth limiting device of claim 1 wherein the stop collar further comprises visually observable means for enabling visual observation of when the stop collar ceases rotation.

14. The depth limiting device of claim 1 further comprising a hole forming bit replacement assembly.

15. The depth limiting device of claim 14 wherein the hole forming bit replacement assembly comprises an axial opening in the stop collar and a set screw reversibly insertable into the opening to engage in reversible locking contact with a portion of the hole forming bit when the hole forming bit is in said fixed depth limited position.

16. A device for precisely forming a hole in a workpiece, comprising:
   a) a hole forming tool; and
   b) a depth limiting device for generating a hole in a workpiece, enabling precise seating of a countersink insert having a countersink portion within said hole at a precise desired depth, comprising:
   a stop collar comprising a shell having an open end portion and a workpiece engaging portion extending along the open end portion thereof for contacting a workpiece;
   a spindle extending axially through the shell, the spindle including a first end extending from the exterior of the stop collar for attachment to a hole forming apparatus, and a second end interior to the stop collar having a centrally located hole forming bit retaining portion having an integral countersink portion for precisely receiving the hole forming bit therein in a fixed depth limiting position, wherein the attached hole forming bit projects through the open end portion of the stop collar at a predetermined length corresponding to the desired death of the hole in the workpiece to enable insertion of the countersink insert precisely matched to the hole therein; and isolating means operatively associated with the stop collar for isolating rotation of the stop collar from the spindle, said isolating means comprising a rotatable annular carriage body and a bearing assembly contained within the annular carriage body for preventing the spindle from moving axially within the stop collar during operation of the hole forming apparatus, and for isolating the rotation of the spindle from the stop collar whereby the stop collar ceases to rotate when contacting the workpiece without generating sufficient frictional contact to mar or otherwise damage the workpiece.

17. The device of claim 16 wherein the hole forming tool is a drilling or boring tool.

18. The device of claim 16 wherein the hole forming bit is a drill bit.

* * * * *

UNITED STATES PATENT AND TRADEMARK OFFICE
CERTIFICATE OF CORRECTION

PATENT NO. : 7,258,513 B2 Page 1 of 1
APPLICATION NO. : 11/125427
DATED : August 21, 2007
INVENTOR(S) : Paul Gertner It is certified that error appears in the above-identified patent and that said Letters Patent is hereby corrected as shown below:

Column 10, line 65 claim 16, the term "death" should be changed to --depth--.

Signed and Sealed this

Twentieth Day of November, 2007

JON W. DUDAS
*Director of the United States Patent and Trademark Office*